United States Patent
Yi-Min

(10) Patent No.: US 8,259,533 B2
(45) Date of Patent: Sep. 4, 2012

(54) METHOD AND DEVICE FOR DETERMINING ULTRASONIC DETECTING CYCLE

(75) Inventor: Lin Yi-Min, Taipei (TW)

(73) Assignee: Lite-On Corporation, Taipei (TW)

( * ) Notice: Subject to any disclaimer, the term of this patent is extended or adjusted under 35 U.S.C. 154(b) by 455 days.

(21) Appl. No.: 12/630,918

(22) Filed: Dec. 4, 2009

(65) Prior Publication Data

US 2011/0061464 A1 Mar. 17, 2011

(30) Foreign Application Priority Data

Sep. 17, 2009 (CN) .......................... 2009 1 0174757

(51) Int. Cl.
*G01S 15/00* (2006.01)
(52) U.S. Cl. .............................. 367/99; 367/87; 367/908
(58) Field of Classification Search .................... 367/87, 367/93, 99, 908; 73/597
See application file for complete search history.

(56) References Cited

U.S. PATENT DOCUMENTS

| 5,877,997 A * | 3/1999 | Fell ................................. 367/99 |
| 6,968,738 B2 * | 11/2005 | Atkinson ..................... 73/290 V |
| 7,103,500 B2 * | 9/2006 | Freger et al. .................. 702/158 |

* cited by examiner

*Primary Examiner* — Ian Lobo
(74) *Attorney, Agent, or Firm* — Thomas, Kayden, Horstemeyer & Risley, LLP

(57) ABSTRACT

A method for determining an ultrasonic detecting cycle is provided. Firstly, an initial detecting cycle T is set. Then, a first sensing wave is generated. Then, a first time-of-flight value is calculated corresponding to the first sensing wave. After the first sensing wave has been generated for the initial detecting cycle T, a second sensing wave is generated. Then, a second time-of-flight value is calculated corresponding to the second sensing wave. Afterwards, the second time-of-flight value is compared with the first time-of-flight value. If a difference between the second time-of-flight value and the first time-of-flight value is smaller than a threshold value, the initial detecting cycle T is determined as the ultrasonic detecting cycle.

11 Claims, 6 Drawing Sheets

METHOD AND DEVICE FOR DETERMINING ULTRASONIC DETECTING CYCLE

FIELD OF THE INVENTION

The present invention relates to a method and a device for detecting ultrasonic wave, and more particularly to a method and a device for determining an ultrasonic detecting cycle.

BACKGROUND OF THE INVENTION

An ultrasonic sensing device is widely used for measuring a relative distance or detecting whether an object is within the sensing range of the ultrasonic sensing device. According to the measuring or detecting result, further actions will be performed.

Generally, when the ultrasonic sensing device is activated, a sensing wave is generated to detect whether any object is within the sensing range of the ultrasonic sensing device. In a case that an object enters the sensing range of the ultrasonic sensing device, the sensing wave is reflected by the object and the reflected sensing wave (also referred as an echo signal) is returned back to the ultrasonic sensing device. When the echo signal is received, the ultrasonic sensing device will calculate the time interval between generation of the sensing wave and receipt of the echo signal, thereby acquiring a time of flight (TOF). According to the time of flight (TOF), the ultrasonic sensing device could estimate the distance between the ultrasonic sensing device and the object. Alternatively, according to the time of flight (TOF), further actions will be performed.

FIG. 1A is a schematic diagram illustrating a conventional ultrasonic sensing device. As shown in FIG. 1A, the ultrasonic sensing device 10 is mounted on a supporting object 21 (e.g. a ceiling or a vehicle). A reference object 22 (e.g. a floor, a desk surface or a wall) is within the sensing range of the ultrasonic sensing device 10. The ultrasonic sensing device 10 could be used to detect whether a foreign object enters the range between the ultrasonic sensing device 10 and the reference object 22, thereby performing further actions. The operating principles of the ultrasonic sensing device 10 will be illustrated in more details as follows with reference to FIG. 1.

First of all, the reference object 22 is detected by the ultrasonic sensing device 10. Generally, after the ultrasonic sensing device 10 is activated, the sensing wave is generated, the echo signal from the reference object 22 is detected, and the time interval between generation of the sensing wave and receipt of the echo signal is calculated. As such, a reference time of flight is acquired. Next, the ultrasonic sensing device 10 periodically generates the sensing wave and receives the echo signal. If the time of flight of the echo signal received by the ultrasonic sensing device 10 is equal to the reference time of flight, the ultrasonic sensing device 10 will discriminate that the echo signal is reflected by the reference object 22. Under this circumstance, no action is done. On the other hand, in a case that a foreign object enters the range between the ultrasonic sensing device 10 and the reference object 22, the sensing wave 11 generated by the ultrasonic sensing device 10 will be reflected back by the foreign object. As such, the time of flight of the echo signal received by the ultrasonic sensing device 10 is not equal to the reference time of flight. Meanwhile, the ultrasonic sensing device 10 discriminates that a foreign object enters the sensing range of the ultrasonic sensing device 10, and further actions are performed.

As known, in a case that the undesired noise is received, erroneous discrimination of the ultrasonic sensing device occurs. In order to prevent from erroneous discrimination, a boundary value is usually predetermined in the ultrasonic sensing device. Once the intensity of the echo signal is greater than the predetermined boundary value, the ultrasonic sensing device will record the time of receiving the echo signal. According to the time of receiving the echo signal, the time of flight will be calculated.

Moreover, after the reference object is detected and the reference time of flight is recorded, the ultrasonic sensing device is in a detecting status. Once the ultrasonic sensing device is operated in the detecting status, the ultrasonic sensing device periodically generates a sensing wave in a predetermined detecting cycle, receives a corresponding effective echo signal, and calculates the time of flight. In such way, the ultrasonic sensing device could determine whether any foreign object enters the sensing range of the ultrasonic sensing device. However, if a multiple reflection effect of the sensing wave occurs, the ultrasonic sensing device fails to actually discriminate whether any foreign object enters the sensing range of the ultrasonic sensing device.

FIG. 1B is a schematic timing waveform diagram of the sensing wave once the multiple reflection effect occurs. After the sensing wave 11 is generated by the ultrasonic sensing device 10, a main echo signal 12 is reflected by the reference object 22 and then received by the ultrasonic sensing device 10 at the time $t_0$. During the main echo signal 12 is returned back to the ultrasonic sensing device 10, the main echo signal 12 also hits the supporting object 21. The main echo signal 12 is reflected by the supporting object 21, moved downwardly to hit the reference object 22, and reflected back to the ultrasonic sensing device 10 again. Consequently, at the time $t_1$, a first reflected echo signal 13 is received by the ultrasonic sensing device 10. During the first reflected echo signal 13 is returned back to the ultrasonic sensing device 10, the first reflected echo signal 13 also hits the supporting object 21. The first reflected echo signal 13 is reflected by the supporting object 21, moved downwardly to hit the reference object 22, and reflected back to the ultrasonic sensing device 10 again. Consequently, at the time $t_2$, a second reflected echo signal 14 is received by the ultrasonic sensing device 10. Similarly, a third reflected echo signal 15 is received by the ultrasonic sensing device 10 at the time $t_3$, and a fourth reflected echo signal 16 is received by the ultrasonic sensing device 10 at the time $t_4$.

As known, the intensity of the reflected echo signal is gradually decreased. As shown in FIG. 1B, the intensities of the third reflected echo signal 15 and the fourth reflected echo signal 16 are lower than the boundary value, so that the third reflected echo signal 15 and the fourth reflected echo signal 16 are ignored by the ultrasonic sensing device 10. Since the intensities of the first reflected echo signal 13 and the second reflected echo signal 14 are still greater than the boundary value, the first reflected echo signal 13 and the second reflected echo signal 14 are deemed as effective echo signals. Since the reflected echo signals having the intensity greater than the predetermined boundary value of the ultrasonic sensing device 10 are deemed as effective echo signals, the ultrasonic sensing device 10 may erroneously discriminate that a foreign object enters the sensing range.

FIG. 2 is a schematic timing waveform diagram illustrating occurrence of an erroneous discrimination of the ultrasonic sensing device. During the process of detecting a foreign object by the ultrasonic sensing device, the ultrasonic sensing device continuously generates the sensing wave in a detecting cycle T. After a first sensing wave 111 has been generated by the ultrasonic sensing device for the detecting cycle T, a second sensing wave 121 is generated by the ultrasonic sensing device. When the first sensing wave 111 hits the reference object 22, a first main echo signal 112 is reflected by reference object 22 and then received by the ultrasonic sensing device. Due to occurrence of the multiple reflection effect, the first main echo signal 112 results in a first reflected echo signal 113, a second reflected echo signal 114, a third reflected echo signal 115 and a fourth reflected echo signal 116. Since the intensities of the third reflected echo signal 115 and the fourth reflected echo signal 116 are lower than the predetermined boundary value of the ultrasonic sensing device, the third reflected echo signal 115 and the fourth reflected echo signal 116 are ignored. Since the intensities of the first reflected echo signal 113 and the second reflected echo signal 114 are still greater than the boundary value, the first reflected echo signal 113 and the second reflected echo signal 114 are deemed as effective echo signals. Similarly, when the second sensing wave 121 hits the reference object 22, a second main echo signal 122 is reflected by reference object 22 and then received by the ultrasonic sensing device. Due to occurrence of the multiple reflection effect, the second main echo signal 122 results in the reflected echo signals 123 and 124.

Generally, the time of flight is calculated according to the effective echo signal first received after the sensing wave is generated. As shown in FIG. 2, the first main echo signal 112 is the effective echo signal first received after the first sensing wave 111 is generated, and the second reflected echo signal 114 is the effective echo signal first received after the second sensing wave 121 is generated. In reality, the actual effective echo signal of the second sensing wave 121 is the second main echo signal 122, rather than the second reflected echo signal 114. In other words, since the time interval between generation of the second sensing wave 121 and receipt of the second reflected echo signal 114 is shorter than the actual time interval, the time of flight is erroneously calculated. Under this circumstance, the ultrasonic sensing device may erroneously discriminate that a foreign object enters the sensing range.

SUMMARY OF THE INVENTION

The present invention provides a method and a device for determining an ultrasonic detecting cycle in order to avoid erroneous discrimination due to the multiple reflection effect.

In accordance with an aspect of the present invention, there is provided a method for determining an ultrasonic detecting cycle. Firstly, an initial detecting cycle T is set. Then, a first sensing wave is generated. Then, a first time-of-flight value is calculated corresponding to the first sensing wave. After the first sensing wave has been generated for the initial detecting cycle T, a second sensing wave is generated. Then, a second time-of-flight value is calculated corresponding to the second sensing wave. Afterwards, the second time-of-flight value is compared with the first time-of-flight value. If a difference between the second time-of-flight value and the first time-of-flight value is smaller than a threshold value, the initial detecting cycle T is determined as the ultrasonic detecting cycle.

In accordance with another aspect of the present invention, there is provided a device for determining an ultrasonic detecting cycle. The device includes a microprocessor and an ultrasonic transducer. The microprocessor is used for setting an initial detecting cycle T, and generating a first emitting signal and a second emitting signal. The ultrasonic transducer is used for generating a first sensing wave and a second sensing wave corresponding to the first emitting signal and the second emitting signal, respectively. Furthermore, the microprocessor calculates a first time-of-flight value corresponding to the first emitting signal, calculates a second time-of-flight value corresponding to the second emitting signal, and compares the second time-of-flight value with the first time-of-flight value. If a difference between the second time-of-flight value and the first time-of-flight value is smaller than a threshold value, the initial detecting cycle T is determined as the ultrasonic detecting cycle.

BRIEF DESCRIPTION OF THE DRAWINGS

The above contents of the present invention will become more readily apparent to those ordinarily skilled in the art after reviewing the following detailed description and accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1A:
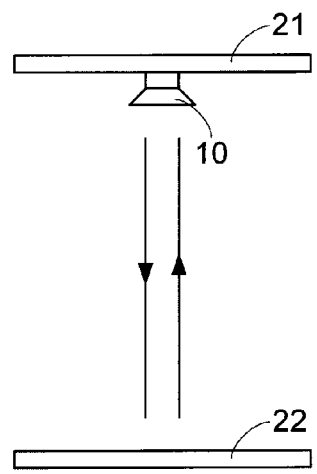
FIG. 1A is a schematic diagram illustrating a conventional ultrasonic sensing device.
Figure 1B:
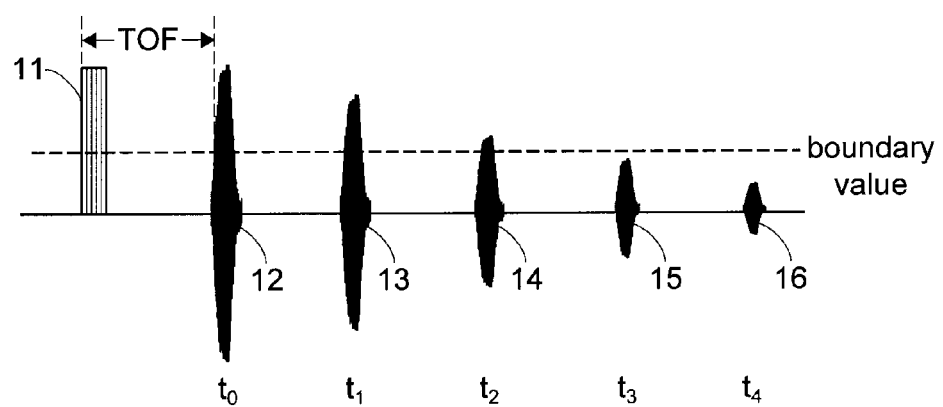
FIG. 1B is a schematic timing waveform diagram of the sensing wave once a multiple reflection effect occurs.
Figure 2:
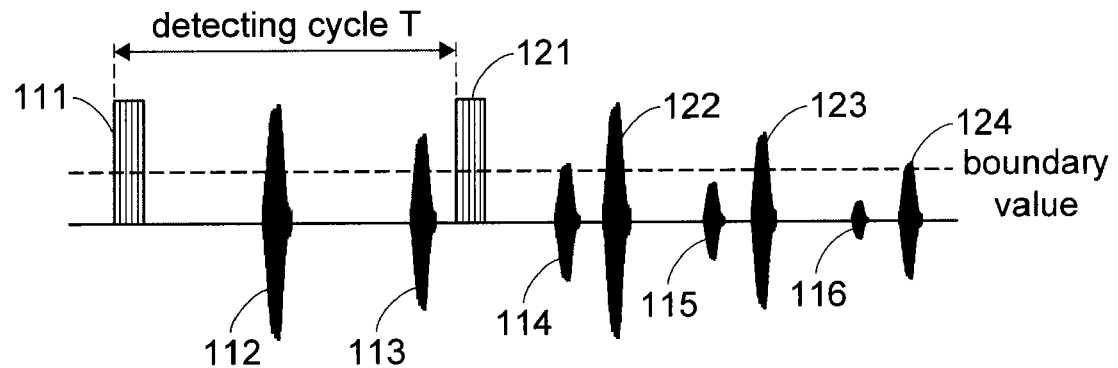
FIG. 2 is a schematic timing waveform diagram illustrating occurrence of an erroneous discrimination of the ultrasonic sensing device.
Figure 3:
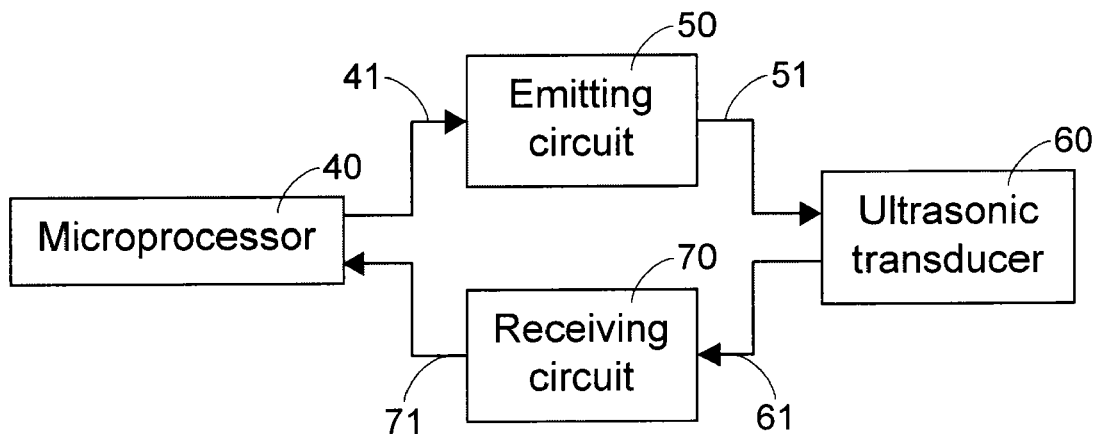
FIG. 3 is a schematic functional block diagram illustrating an exemplary ultrasonic sensing device of the present invention.

FIG. 3 is a schematic functional block diagram illustrating an exemplary ultrasonic sensing device of the present invention. As shown in FIG. 3, the ultrasonic sensing device comprises a microprocessor 40, an emitting circuit 50, an ultrasonic transducer 60 and a receiving circuit 70. The microprocessor 40 generates an emitting signal 41 to the emitting circuit 50. When the emitting signal 41 is received by the emitting circuit 50, the emitting signal 41 is converted into a driving signal 51 by the emitting circuit 50. The driving signal 51 is transmitted to the ultrasonic transducer 60. According to the driving signal 51, the ultrasonic transducer 60 generates a sensing wave. Once the sensing wave hits an object, the sensing wave is reflected by the object and the reflected sensing wave (also referred as an echo signal) is returned back to the ultrasonic transducer 60. When the echo signal is received by the ultrasonic transducer 60, the ultrasonic transducer 60 generates a vibrating signal 61, which is transmitted to the receiving circuit 70. According to the vibrating signal, the receiving circuit 70 generates a receiving signal 71, which is transmitted to the microprocessor 40. According to the receiving signal 71, the microprocessor 40 will calculate the time of flight (TOF) between the ultrasonic sensing device and the object.

Moreover, a detecting cycle for generating the sensing wave by the ultrasonic sensing device is predetermined in the microprocessor 40. According to the predetermined detecting cycle, the microprocessor 40 generates the emitting signal 41. In other words, the ultrasonic sensing device generates the sensing wave according to the predetermined detecting cycle. Moreover, a boundary value is also predetermined in the microprocessor 40. For initially ignoring the adverse influence of undesired noise, the microprocessor 40 will discriminate whether the receiving signal 71 is effective according to the predetermined boundary value. In an embodiment, the predetermined boundary value is equal to 50% or 60% of the magnitude of the maximum receiving signal 71. Alternatively, the predetermined boundary value is equal to the average of several successive receiving signals 71. The procedure of predetermining the boundary value is known in the art, and is not redundantly described herein.

Figure 4A:
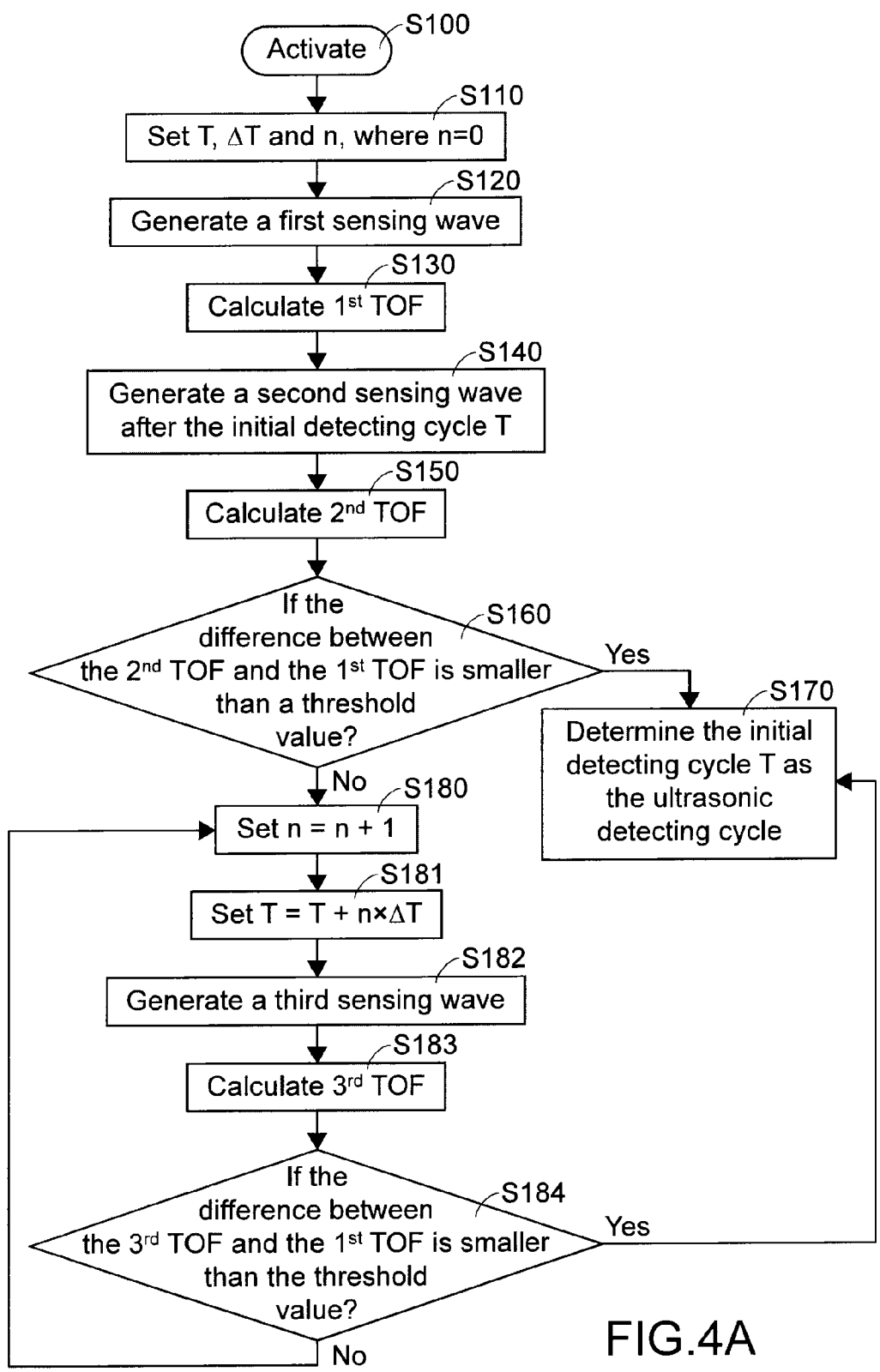
FIG. 4A is a flowchart illustrating a method for determining an ultrasonic detecting cycle according to a first embodiment of the present invention.

FIG. 4A is a flowchart illustrating a method for determining an ultrasonic detecting cycle according to a first embodiment of the present invention. After the ultrasonic sensing device is activated (Step S100), the microprocessor 40 sets an initial detecting cycle T, a time increment ΔT and a variable integer n, where n=0 (Step S110). Next, the ultrasonic sensing device generates a first sensing wave (Step S120). When the first sensing wave hits the reference object, an echo signal is reflected by reference object and then received by the ultrasonic sensing device. Next, according to the effective echo signal first received after the first sensing wave is generated, the microprocessor 40 calculates a first time-of-flight value ($1^{st}$ TOF) (Step S130). After the initial detecting cycle T, the microprocessor 40 generates an emitting signal and thus the ultrasonic sensing device generates a second sensing wave (Step S140). Similarly, when the second sensing wave hits the reference object, an echo signal is reflected by reference object and then received by the ultrasonic sensing device. Next, according to the effective echo signal first received after the second sensing wave is generated, the microprocessor 40 calculates a second time-of-flight ($2^{nd}$ TOF) value (Step S150).

Next, the microprocessor 40 compares the second time-of-flight value with the first time-of-flight value, and discriminates whether the difference between the second time-of-flight value and the first time-of-flight value is smaller than a threshold value (e.g. 1 ms) (Step S160). If the difference between the second time-of-flight value and the first time-of-flight value is smaller than the threshold value, the initial detecting cycle T is determined as the ultrasonic detecting cycle (Step S170). After the ultrasonic detecting cycle is determined, the microprocessor 40 will periodically generates the emitting signal in every ultrasonic detecting cycle. Since the sensing wave is periodically generated by the ultrasonic sensing device in every ultrasonic detecting cycle, the ultrasonic sensing device is capable of discriminating whether a foreign object enters the sensing range.

On the other hand, if the difference between the second time-of-flight value and the first time-of-flight value is greater than the threshold value, the variable integer n is adjusted to be (n+1) (Step S180). Next, the microprocessor 40 adjusts the initial detecting cycle T to be T+n×ΔT (Step S181). After the second sensing wave has been generated for the updated initial detecting cycle T, the microprocessor 40 generates an emitting signal and thus the ultrasonic sensing device generates a third sensing wave (Step S182). Similarly, when the third sensing wave hits the reference object, an echo signal is reflected by reference object and then received by the ultrasonic sensing device. Next, according to the effective echo signal first received after the third sensing wave is generated, the microprocessor 40 calculates a third time-of-flight value (Step S183). Next, the microprocessor 40 compares the third time-of-flight value with the first time-of-flight value, and discriminates whether the difference between the third time-of-flight value and the first time-of-flight value is smaller than the threshold value (Step S184). If the difference between the third time-of-flight value and the first time-of-flight value is smaller than the threshold value, the updated initial detecting cycle T is determined as the ultrasonic detecting cycle (Step S170). On the other hand, if the difference between the third time-of-flight value and the first time-of-flight value is greater than the threshold value, the variable integer n is continuously adjusted to be (n+1) (Step S180).

Figure 4B:
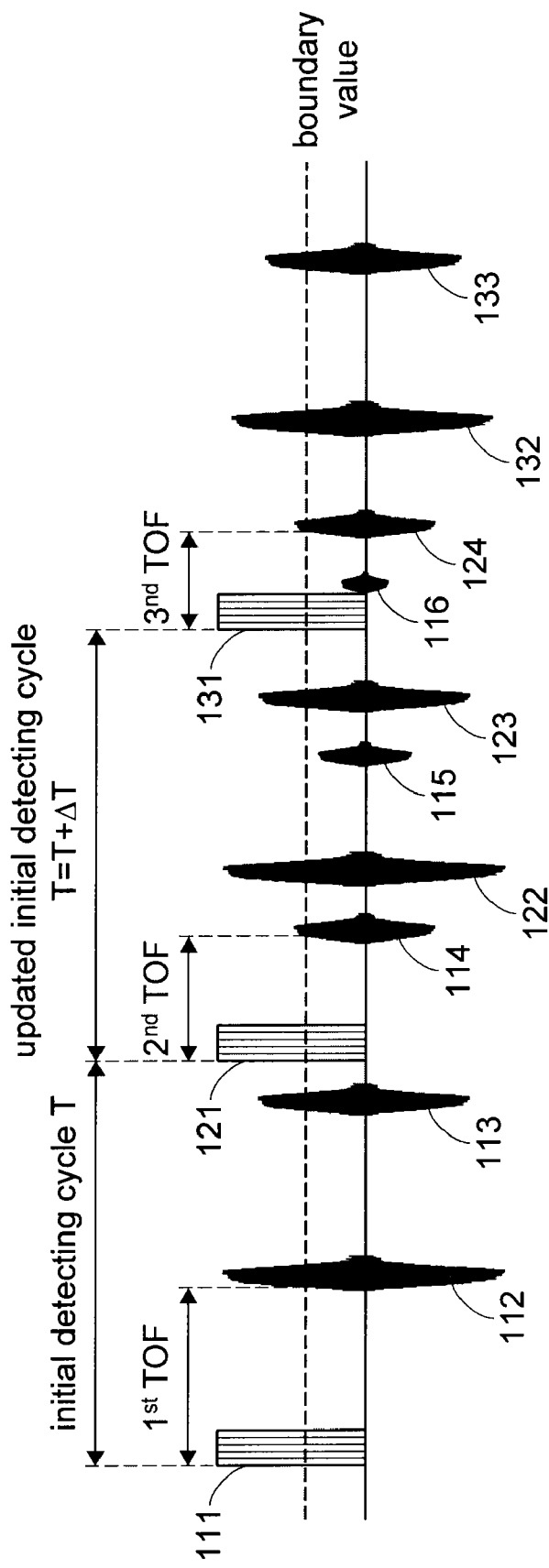
FIG. 4B is a schematic timing waveform diagram illustrating the related signal processed by the method according to the first embodiment of the present invention.

FIG. 4B is a schematic timing waveform diagram illustrating the related signal processed by the method according to the first embodiment of the present invention. After a first sensing wave 111 is generated by the ultrasonic sensing device, the first sensing wave 111 hits the reference object 22, and thus a first main echo signal 112 is reflected by reference object 22 and then received by the ultrasonic sensing device. Due to occurrence of the multiple reflection effect, the first main echo signal 112 results in a first reflected echo signal 113, a second reflected echo signal 114, a third reflected echo signal 115 and a fourth reflected echo signal 116. Since the intensities of the third reflected echo signal 115 and the fourth reflected echo signal 116 are lower than the predetermined boundary value of the ultrasonic sensing device, the third reflected echo signal 115 and the fourth reflected echo signal 116 are ignored. Since the intensities of the first reflected echo signal 113 and the second reflected echo signal 114 are still greater than the boundary value, the first reflected echo signal 113 and the second reflected echo signal 114 are deemed as effective echo signals.

As shown in FIG. 4B, the first main echo signal 112 is the effective echo signal first received after the first sensing wave 111 is generated. When the first main echo signal 112 is received, the microprocessor 40 will calculate the time interval between generation of the first sensing wave 111 and receipt of the first main echo signal 112, thereby acquiring a first time-of-flight ($1^{st}$ TOF) value.

After a first sensing wave 111 has been generated by the ultrasonic sensing device for the initial detecting cycle T, an emitting signal is generated by the microprocessor 40 and thus a second sensing wave 121 is generated by the ultrasonic sensing device. Similarly, when the second sensing wave 121 hits the reference object 22, a second main echo signal 122 is reflected by reference object 22 and then received by the ultrasonic sensing device. Due to occurrence of the multiple reflection effect, the second main echo signal 122 results in the reflected echo signals 123 and 124. The echo signals 122, 123 and 124 are all effective echo signals.

In reality, the actual effective echo signal of the second sensing wave 121 is the second main echo signal 122. However, as shown in FIG. 4B, the second reflected echo signal 114 of the first main echo signal 112 is the effective echo signal first received after the second sensing wave 121 is generated. When the second reflected echo signal 114 is received, the microprocessor 40 will calculate the time interval between generation of the second sensing wave 121 and receipt of the second reflected echo signal 114, thereby acquiring a second time-of-flight ($2^{nd}$ TOF) value. Due to occurrence of the multiple reflection effect, the second time-of-flight value is shorter than the first time-of-flight value.

After the second time-of-flight value is calculated, the microprocessor 40 will compare whether the difference between the second time-of-flight value and the first time-of-flight value is smaller than a threshold value. If the difference between the second time-of-flight value and the first time-of-flight value is smaller than the threshold value, it is meant that the effective echo signals first received after the first sensing wave and the second sensing wave are respective main echo signals. Under this circumstance, the initial detecting cycle T is determined as the ultrasonic detecting cycle by the microprocessor 40. After the ultrasonic detecting cycle is determined, the microprocessor 40 will periodically generates the emitting signal in every ultrasonic detecting cycle in order to determine whether a foreign object enters the sensing range of the ultrasonic sensing device.

Please refer to FIG. 4B again. Since the difference between the second time-of-flight value and the first time-of-flight value is greater than the threshold value, the microprocessor 40 adjusts the variable integer n and the initial detecting cycle T to be (n+1) and T+n×ΔT, respectively, wherein the initial value of the variable integer n is 0, and ΔT is the time increment. After the updated initial detecting cycle T, the ultrasonic sensing device generates a third sensing wave 131. In reality, the actual effective echo signal of the third sensing wave 131 is the third main echo signal 132. As shown in FIG. 4B, the reflected echo signal 124 of the second main echo signal 122 is the effective echo signal first received after the third sensing wave 131 is generated. When the reflected echo signal 124 is received, the microprocessor 40 will calculate the time interval between generation of the third sensing wave 131 and receipt of the reflected echo signal 124, thereby acquiring a third time-of-flight ($3^{rd}$ TOF) value.

After the third time-of-flight value is calculated, the microprocessor 40 will compare whether the difference between the third time-of-flight value and the first time-of-flight value is smaller than a threshold value. If the difference between the third time-of-flight value and the first time-of-flight value is smaller than the threshold value, the updated initial detecting cycle T is determined as the ultrasonic detecting cycle by the microprocessor 40. After the ultrasonic detecting cycle is determined, the microprocessor 40 will periodically generates the emitting signal in every ultrasonic detecting cycle in order to determine whether a foreign object enters the sensing range of the ultrasonic sensing device. Since the difference between the third time-of-flight value and the first time-of-flight value is greater than the threshold value, the microprocessor 40 adjusts the variable integer n and the initial detecting cycle T to be (n+1) and T+n×ΔT, respectively. After the updated initial detecting cycle T, the ultrasonic sensing device generates a next sensing wave and a next time-of-flight value is calculated. The above procedure is repeatedly done until the difference between the calculated time-of-flight value and the first time-of-flight value is smaller than the threshold value, and thus the updated initial detecting cycle T is determined as the ultrasonic detecting cycle by the microprocessor 40. After the ultrasonic detecting cycle is determined, the microprocessor 40 will periodically generates the emitting signal in every ultrasonic detecting cycle in order to determine whether a foreign object enters the sensing range of the ultrasonic sensing device.

Figure 5A:
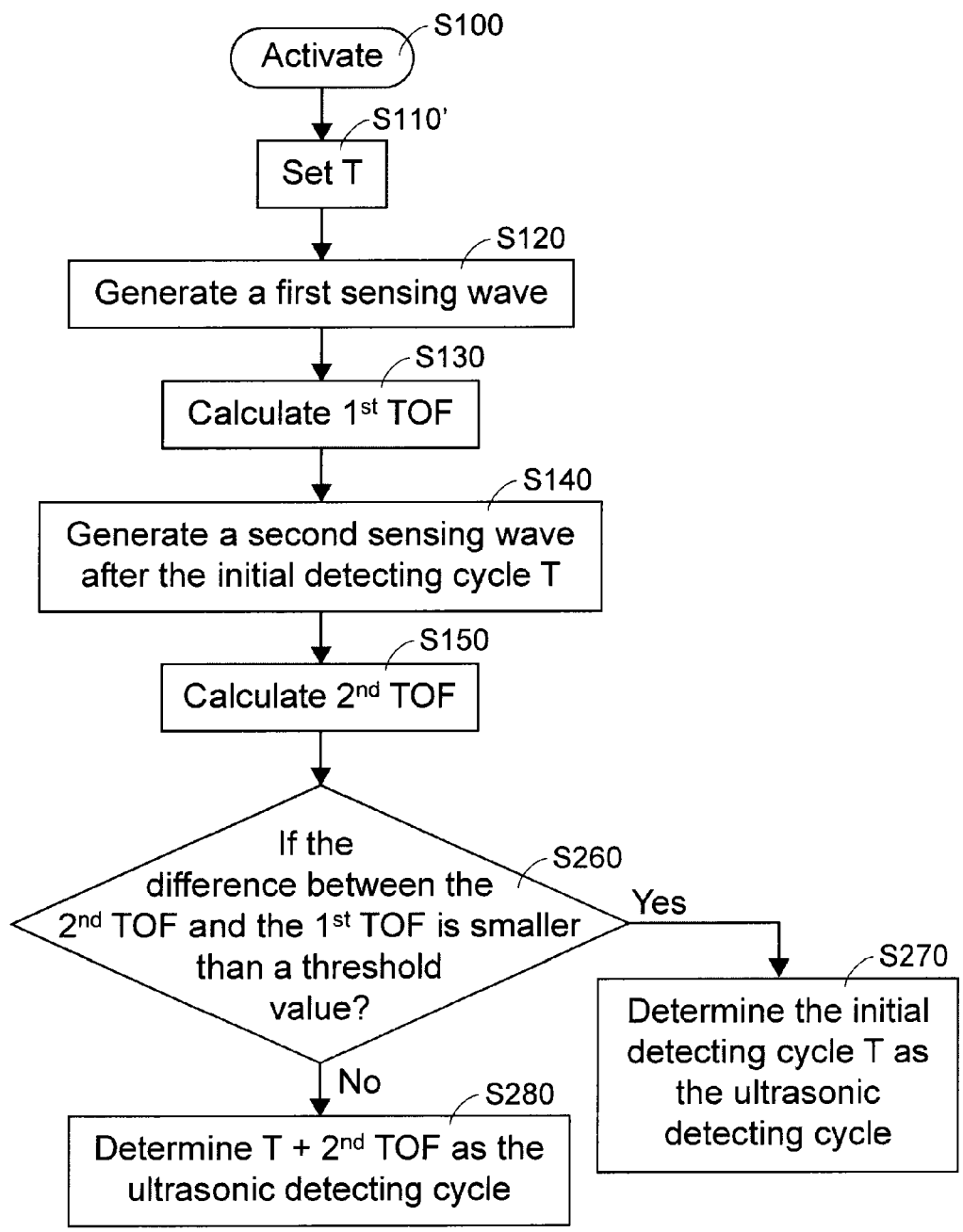
FIG. 5A is a flowchart illustrating a method for determining an ultrasonic detecting cycle according to a second embodiment of the present invention.

FIG. 5A is a flowchart illustrating a method for determining an ultrasonic detecting cycle according to a second embodiment of the present invention. After the ultrasonic sensing device is activated (Step S100), the microprocessor 40 sets an initial detecting cycle T (Step S110'). Next, the ultrasonic sensing device generates a first sensing wave (Step S120). According to the effective echo signal first received after the first sensing wave is generated, the microprocessor 40 calculates a first time-of-flight ($1^{st}$ TOF) value (Step S130). After the initial detecting cycle T, the ultrasonic sensing device generates a second sensing wave (Step S140). According to the effective echo signal first received after the second sensing wave is generated, the microprocessor 40 calculates a second time-of-flight ($2^{nd}$ TOF) value (Step S150).

Next, the microprocessor 40 will compare whether the difference between the second time-of-flight value and the first time-of-flight value is smaller than a threshold value (Step S260). If the difference between the second time-of-flight value and the first time-of-flight value is smaller than the threshold value, the initial detecting cycle T is determined as the ultrasonic detecting cycle by the microprocessor 40 (Step S270). After the ultrasonic detecting cycle is determined, the microprocessor 40 will periodically generates the emitting signal in every ultrasonic detecting cycle in order to determine whether a foreign object enters the sensing range of the ultrasonic sensing device. On the other hand, if the difference between the second time-of-flight value and the first time-of-flight value is greater than the threshold value, the sum of the initial detecting cycle T and the second time-of-flight value is determined as the ultrasonic detecting cycle by the microprocessor 40 (Step S280). After the ultrasonic detecting cycle is determined, the ultrasonic sensing device will periodically generates the sensing wave in every ultrasonic detecting cycle in order to determine whether a foreign object enters the sensing range of the ultrasonic sensing device.

Figure 5B:
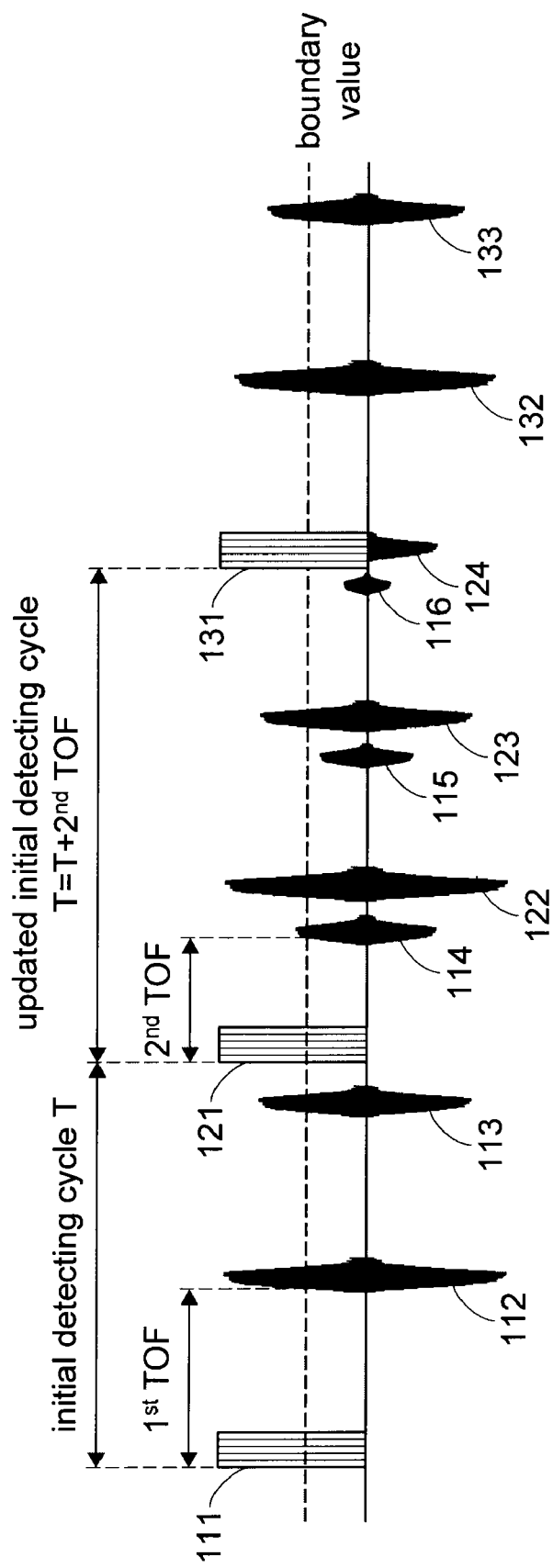
FIG. 5B is a schematic timing waveform diagram illustrating the related signal processed by the method according to the second embodiment of the present invention.

FIG. 5B is a schematic timing waveform diagram illustrating the related signal processed by the method according to the second embodiment of the present invention. As described in FIG. 4B, the first main echo signal 112 is the effective echo signal first received after the first sensing wave 111 is generated. When the first main echo signal 112 is received, the microprocessor 40 will calculate the time interval between generation of the first sensing wave 111 and receipt of the first main echo signal 112, thereby acquiring a first time-of-flight ($1^{st}$ TOF) value. As described in FIG. 4B, the second reflected echo signal 114 of the first main echo signal 112 is the effective echo signal first received after the second sensing wave 121 is generated. When the second reflected echo signal 114 is received, the microprocessor 40 will calculate the time interval between generation of the second sensing wave 121 and receipt of the second reflected echo signal 114, thereby acquiring a second time-of-flight ($2^{nd}$ TOF) value. Due to occurrence of the multiple reflection effect, the second time-of-flight value is not equal to the first time-of-flight value. If the difference between the second time-of-flight value and the first time-of-flight value is greater than the threshold value, the sum of the initial detecting cycle T and the second time-of-flight value is determined as the ultrasonic detecting cycle by the microprocessor 40. Next, the ultrasonic detecting cycle generates a third sensing wave 131 according to the updated ultrasonic detecting cycle in order to determine whether a foreign object enters the sensing range of the ultrasonic sensing device.

As shown in FIG. 5B, since the time of emitting the third sensing wave 131 is substantially consistent with the time of receiving the reflected echo signal 124 of the second main echo signal 122, the third main echo signal 132 is the effective echo signal first received after the third sensing wave 131 is generated. Under this circumstance, the adverse influence of the multiple reflection effect is minimized.

The method for determining the ultrasonic detecting cycle according to the present invention could be performed once the ultrasonic detecting device is activated. Alternatively, the method for determining the ultrasonic detecting cycle according to the present invention could be periodically performed or adjusted according to the practical applications or environments. The method could be controlled by firmware without any additional component. As a consequence, the method for determining the ultrasonic detecting cycle according to the present invention is cost-effective and is capable of avoiding erroneous discrimination due to the multiple reflection effect.

While the invention has been described in terms of what is presently considered to be the most practical and preferred embodiments, it is to be understood that the invention needs not to be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A processor-implemented method for determining an ultrasonic detecting cycle of an ultrasonic sensing device including an ultrasonic transducer, the method comprising steps of:
    setting an initial detecting cycle T;
    generating a first sensing wave by the ultrasonic transducer;
    calculating a first time-of-flight value corresponding to the first sensing wave;
    generating a second sensing wave by the ultrasonic transducer after the first sensing wave has been generated for the initial detecting cycle T;
    calculating a second time-of-flight value corresponding to the second sensing wave;
    comparing the second time-of-flight value with the first time-of-flight value, wherein if a difference between the second time-of-flight value and the first time-of-flight value is smaller than a threshold value, the initial detecting cycle T is determined as the ultrasonic detecting cycle, wherein if the difference between the second time-of-flight value and the first time-of-flight value is greater than the threshold value, the initial detecting cycle T is adjusted for generating a third emitting signal; and
    using the ultrasonic detecting cycle to periodically generate a plurality of sensing waves for discriminating whether a foreign object enters a sensing range.

2. The method according to claim 1 wherein the first time-of-flight value is a time interval between generation of the first sensing wave and receipt of an effective echo signal that is first received after the first sensing wave is generated, and the second time-of-flight value is a time interval between generation of the second sensing wave and receipt of an effective echo signal that is first received after the second sensing wave is generated.

3. The method according to claim 1 further comprising a step of setting a time increment $\Delta T$ and a variable integer n, where n=0.

4. The method according to claim 3 further comprising steps of:
    (a1) adjusting the variable integer n to be (n+1) if the difference between the second time-of-flight value and the first time-of-flight value is greater than the threshold value;
    (a2) adjusting the initial detecting cycle T to be an updated initial detecting cycle T+n×$\Delta T$;
    (a3) generating the third sensing wave after the second sensing wave has been generated for the updated initial detecting cycle;
    (a4) calculating a third time-of-flight value corresponding to the third sensing wave; and
    (a5) comparing the third time-of-flight value with the first time-of-flight value, wherein if a difference between the third time-of-flight value and the first time-of-flight value is smaller than the threshold value, the updated initial detecting cycle is determined as the ultrasonic detecting cycle, wherein if the difference between the third time-of-flight value and the first time-of-flight value is greater than the threshold value, the steps (a1)~(a5) are repeatedly done.

5. The method according to claim 4 wherein the third time-of-flight value is a time interval between generation of the third sensing wave and receipt of an effective echo signal that is first received after the third sensing wave is generated.

6. The method according to claim 1 further comprising a step of determining the sum of the initial detecting cycle T and the second time-of-flight value as the ultrasonic detecting cycle if the difference between the second time-of-flight value and the first time-of-flight value is greater than the threshold value.

7. A device for determining an ultrasonic detecting cycle, the device comprising:
    a microprocessor for setting an initial detecting cycle T, and generating a first emitting signal and a second emitting signal; and
    an ultrasonic transducer for generating a first sensing wave and a second sensing wave according to the first emitting signal and the second emitting signal, respectively,
    wherein the microprocessor calculates a first time-of-flight value corresponding to the first emitting signal, calculates a second time-of-flight value corresponding to the second emitting signal, and compares the second time-of-flight value with the first time-of-flight value,
    wherein if a difference between the second time-of-flight value and the first time-of-flight value is smaller than a threshold value, the initial detecting cycle T is determined as the ultrasonic detecting cycle,
    wherein if the difference between the second time-of-flight value and the first time-of-flight value is greater than the threshold value, adjusting the initial detecting cycle T for generating a third emitting signal.

8. The device according to claim 7 further comprising:
    an emitting circuit interconnected between the microprocessor and the ultrasonic transducer for generating a first driving signal and a second driving signal to the ultrasonic transducer corresponding to the first emitting signal and the second emitting signal, respectively; and
    a receiving circuit connected to the ultrasonic transducer, wherein when an echo signal is received by the ultrasonic transducer, the ultrasonic transducer generates a vibrating signal to the receiver circuit, and the receiving circuit generates a receiving signal to the microprocessor according to the vibrating signal.

9. The device according to claim 7 wherein the microprocessor further sets a time increment $\Delta T$ and a variable integer n, where n=0.

10. The device according to claim 9 wherein the microprocessor further performs steps of:
    (a1) adjusting the variable integer n to be (n+1) if the difference between the second time-of-flight value and the first time-of-flight value is greater than the threshold value;
    (a2) adjusting the initial detecting cycle T to be an updated initial detecting cycle T+n×$\Delta T$;

(a3) generating the third emitting signal after the second emitting signal has been generated for the updated initial detecting cycle;
(a4) calculating a third time-of-flight value corresponding to the third emitting signal; and
(a5) comparing the third time-of-flight value with the first time-of-flight value, wherein if a difference between the third time-of-flight value and the first time-of-flight value is smaller than the threshold value, the updated initial detecting cycle is determined as the ultrasonic detecting cycle, wherein if the difference between the third time-of-flight value and the first time-of-flight value is greater than the threshold value, the steps (a1)~(a5) are repeatedly done.

11. The device according to claim 7 wherein if the difference between the second time-of-flight value and the first time-of-flight value is greater than the threshold value, the sum of the initial detecting cycle T and the second time-of-flight value is determined as the ultrasonic detecting cycle.

* * * * *